C. C. DODGE.
COUNTERBALANCED CRANK SHAFT.
APPLICATION FILED MAY 9, 1918. RENEWED NOV. 24, 1919.

1,351,417.

Patented Aug. 31, 1920.

Inventor:
Charles C. Dodge.
By Thurston & Rivers
att'ys.

UNITED STATES PATENT OFFICE.

CHARLES C. DODGE, OF CLEVELAND, OHIO, ASSIGNOR TO THE PARK DROP FORGE COMPANY, OF CLEVELAND, OHIO, A CORPORATION OF OHIO.

COUNTERBALANCED CRANK-SHAFT.

1,351,417. Specification of Letters Patent. Patented Aug. 31, 1920.

Application filed May 9, 1918. Serial No. 233,482. Renewed November 24, 1919. Serial No. 340,306.

*To all whom it may concern:*

Be it known that I, CHARLES C. DODGE, a citizen of the United States, residing at Cleveland, in the county of Cuyahoga and State of Ohio, have invented a certain new and useful Improvement in Counterbalanced Crank-Shafts, of which the following is a full, clear, and exact description.

Engineers are rapidly recognizing the desirability of using counterbalanced crank shafts in high speed engines on automobiles and aeroplanes; and the use of such counterbalanced crank shafts is increasing, and would increase more rapidly were it not for the more or less general apprehension that counterweights, applied as they have been heretofore applied in commercial practice, are liable to fly off under the influence of the immense centrifugal force generated when a shaft is turning at high speed, thereby causing an immense amount or irreparable damage.

Crank shafts formed by the die forging process are in almost universal use, because crank shafts having necessary strength can be produced at a reasonable cost only by this process.

Counterweights have been applied to such die forged crank shafts commercially in two ways, to wit, they have been secured by bolts or screws substantially as shown in the Fekete Patent No. 1,165,861, and they have been welded on by the method substantially as shown and described in the Gordon Patent No. 1,232,791. Whether or not there is any justification for such apprehension, it is nevertheless true that there is general apprehension that crank shafts produced by either method above referred to are unsafe.

The object of the present invention is to provide a die forged counterbalanced crank shaft at a reasonable cost, which is safe in a very much higher degree than either of the two kinds of counterbalanced crank shafts above referred to.

To that end the invention consists in the combination of parts which is hereinafter described and illustrated in the accompanying drawings and pointed out in the appended claims.

Figure 1:
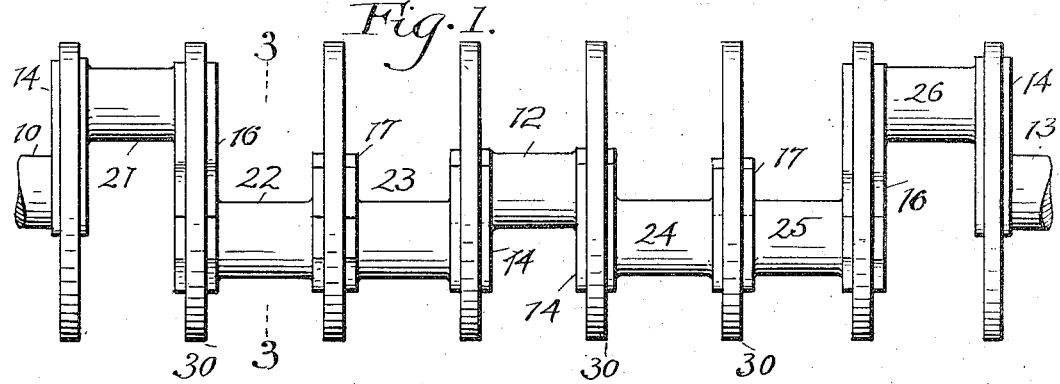
Figures 3, 4, 5:
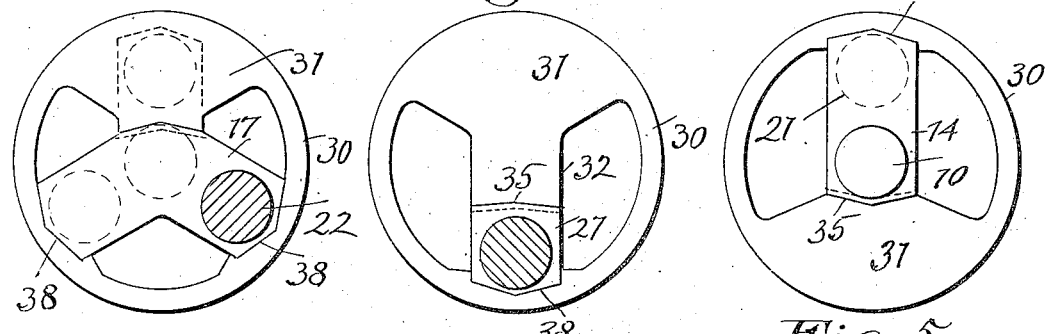
Figure 6:
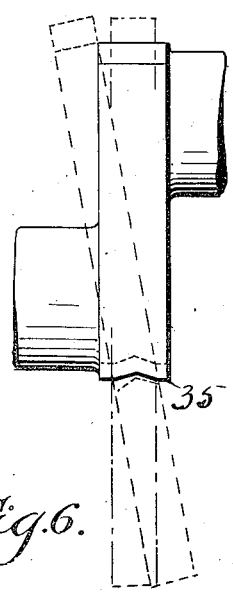
Figure 7:
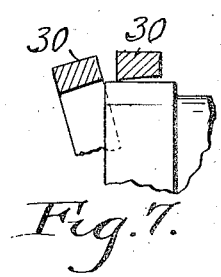
Figure 2:
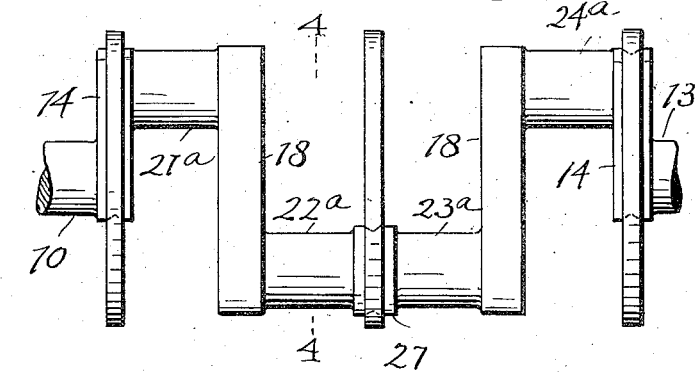

In the drawings, Figure 1 is a side elevation of a 3-bearing 6-throw crank shaft constructed and counterbalanced in accordance with the present invention; Fig. 2 is a similar view of a 2-bearing 4-throw crank shaft; Fig. 3 is a sectional side elevation in the plane of line 3—3 on Fig. 1; Fig. 4 is a sectional side elevation in the plane of line 4—4 on Fig. 2; Fig. 5 is an end view of either of said shafts, and in fact of any crank shaft counterbalanced according to the present invention; Fig. 6 is a front view showing the manner in which according to the present invention counterweights are applied to one of the short arms of a crank shaft; Fig. 7 is a diametrical section through the thin side of one annular counterbalancing weight and the part of a crank arm with which it engages, showing particularly a structural expedient for insuring that the counterweighting rings may be placed in the desired position on a shaft.

The 3-bearing 6-throw crank shaft shown in Fig. 1, before the counterweights are applied thereto, is generically of familiar construction. The shaft is formed with two end bearing portions 10 and 13, and a middle bearing 12. Between each end bearing and the middle bearing are three crank pins. Those crank pins at the left of the middle bearing are indicated by 21, 22, 23, and those at the right of the middle bearing by 24, 25, 26. A short crank arm 14 which may be shaped substantially as shown in Fig. 5, extends radially from the bearing portion 10 of the shaft, and the crank pin 21 is integrally connected with it. A similar short crank arm 14 connects the crank pin 23 with the middle bearing portion 12 of the shaft. The crank pins 22 and 23 are connected to each other by a long and preferably curved crank arm 17, the shape of which is shown in Fig. 3. The crank pins 21 and 22 are connected by a similar long crank arm 16.

The construction of the shaft on the other side of its center bearing is substantially as just described, that is to say, short crank arms 14 connect the crank pins 24, 26, respectively, with the bearing portions 12 and 13, and long crank arms 16 and 17 respectively connect together crank pins 25, 26, and crank pins 24, 25.

In the 2-bearing 4-throw crank shaft shown in Fig. 2 there are two end bearing portions 10 and 13. A short arm 14, like that shown in Fig. 5, connects the bearing portion 10 with a crank pin 21$^a$, and a similar short crank arm 14 connects the other bearing portion 13 with a crank pin 24$^a$. The crank pins 22ª and 23ª are in alinement with one another, and are connected together by the part 27, and their axis is diametrically opposite the axis of the two crank pins 21ª, 24ª. The crank pins 21ª and 22ª are connected by a long crank arm 18, which extends diametrically from one to the other; and the crank pins 23ª, 24ª are connected by a similar long crank arm 18. This shaft in the particulars referred to is also of familiar form.

By the former methods of counterweighting crank shafts of these kinds, counterweights have been bolted or welded to each short crank arm, and to each long crank arm of a six throw shaft, and to the part 27 which is intermediate of and connects the two crank arms 22ª, 23ª, of the four throw crank shaft shown in Fig. 2. In fact, the counterweights must be applied at these points to produce the desired result.

The counterweights employed in the construction shown in the drawing are different in respect to their construction and in that respect to the manner of applying them to these various crank shafts from any which have been heretofore used or conceived so far as I know. Each counterweight is an open annulus, represented generally by 30. The major part of each annulus is a thin band of metal; but at a suitable point, comprising approximately one-third of the ring or annulus, said annulus is formed with an integral counterweighting arm which extends in a radial direction toward the axis of the crank shaft to a point where it may engage with the part of the crank shaft to which the counweighted annulus must be attached.

Each of these counterbalancing rings is shrunk onto the part of the crank shaft to which it is adapted and fitted, with the inner end of the counterbalancing arm, and a thin part of the ring in engagement with corresponding parts of the crank shaft. These engaging parts of the ring and crank shaft are constructed to interlock and insure that there shall be no relative movement of the ring and shaft when once the ring is applied to the shaft. Each ring is so applied that the center of weight of the counterbalancing arm lies on the opposite side of the axis of the shaft as compared with the center of weight of the part of the shaft which is to be counterbalanced thereby.

One can not definitely determine what size and shape these counterweighting arms shall have unless one knows the rate of revolution of the shaft at which the most efficient counterweighting is desired. It is well understood that in counterbalancing a crank shaft one has to take into consideration the offcenter weight of the parts of the crank shaft requiring counterbalancing, and the weight of parts of the connecting rod employed; and also the rate of revolution at which one wishes to have the counterbalancing most effective; because if a shaft be counterbalanced perfectly at, say, 1500 revolutions per minute, the counterweighting becomes less perfect as the speed either increases or decreases. Generally speaking, however, the desired results may be attained by making the counterweighting arms of substantially fan-shape, that is to say, of gradually increasing width from the point at which they engage the crank shaft to the part of the ring with which these weights becomes merged.

To prevent the possibility of the relative rotation of the engaging parts of the counterbalancing ring and the shaft, the engaging surfaces of the counterbalancing arm and the part of the shaft with which it engages are made nonconcentric with respect to the axis of the shaft. Preferably these surfaces are in the form of an obtuse V, as shown at 35 in Figs. 3, 4 and 5. To insure against movement of the ring on the shaft endwise of the latter, these V-shaped engaging surfaces are formed the one with a V-shaped projecting rib 36, and the other with a V-shaped groove 37, to which said rib is fitted, as shown most clearly in Fig. 6.

To apply these counterbalancing rings constructed as described to the various parts of the shaft the rings are first heated to such a degree that the ring, and especially the thin parts thereof will expand and increase in diameter. Then the ring is passed over the shaft to the point of application. Then the ring is tilted substantially as shown in Fig. 5 so as to cause the engagement of the inner end of the counterweighting arm with the part of the shaft which is constructed to fit. Then the ring will be swung from the position shown into a position shown by dotted lines in this same figure, and as shown by full lines in all of the other figures, where the axis of the ring will become coincident with the axis of the shaft. The fact that the ring has been heated and thereby increased in diameter permits it to be moved to the position stated. The ring is of such diameter that when it has cooled it will contract and tightly grip the part of the shaft to which it is applied, that is to say, the end of the counterbalancing arm and a small part of the thin part of the ring will grip the off-center part of the shaft between them, and will effectually prevent any disengagement of the interlocking parts of the shaft and the end of the counterbalancing arm. To permanently fix the ring to the shaft in the position stated, one may solder or torch weld the thin part of the ring to the part of the shaft with which it engages. Likewise, it is preferable that the engaging surfaces of the shaft and thin part or parts of the ring be made nonconcentric with respect to the shaft that is in the form of a very obtuse V, as shown at 38 in various figures.

Specifically in applying these rings to the short arm 14 of any crank shaft the counterbalancing ring will be applied so that the weighted arm will lie on the opposite side of the axis of the shaft to the center of weight of said crank arm, and its attached crank pin. The end of the crank arm adjacent the axis of the crank shaft will have the circumferentially disposed obtuse V formation, and in this end will be the V-shaped recess which will receive the V-shaped projection on the inner end of the counterbalancing arm.

In applying a counterweighting ring to the part 27 of a two-bearing four-throw crank shaft the surface of said part 27 nearest the axis of the crank shaft will be formed with the V-groove to receive the V-shaped projection on the inner end of the counterbalancing arm.

In applying the counterweight to the long arm of a six-throw crank shaft the end of the counterbalancing arm will engage the long crank arm midway between its ends, and both ends of the crank arm will engage parts of the thin part of the counterbalancing ring as shown in Fig. 3.

The counterweighting rings have been shown applied to a three bearing six-throw crank shaft, and to a two bearing four-throw crank shaft, because these are specifically the kinds of crank shafts to which the application of counterbalancing rings presents difficulties which are not overcome by any previous constructions known to me. In the two types of crank shafts referred to, the crank arms differ in size and shape.

In order to be able to apply some rings to a small crank arm, or to a small part of the shaft, it is necessary that such a ring be capable of passing over one of the large crank arms. While all of the counter-balancing rings are formed with the same means for attaching them, these means are such that they may be so varied in size and shape that openings may be left through the rings large enough to permit them to be moved along the shaft from one end to the point of ultimate application to the shaft. It is obvious however, that any form of crank shaft may be counterweighted by the means and in the manner hereinbefore described.

Having described my invention, I claim:—

1. The combination with a crank shaft, of a counterbalancing ring applied to an offcenter part of said crank shaft in such position that the axis of the ring shall be coincident with the axis of the shaft,—said ring having an integral counterweighting arm which extends from one side of the ring toward the axis thereof, the end of said arm being in engagement with an offcenter part of the crank shaft, and the engaging surfaces of said arm and crank shaft being interlocked to prevent relative movement of the ring and shaft, and a portion only of the thin part of said ring being also in engagement with and being permanently secured to an adjacent part of the crank shaft.

2. The combination with a crank shaft of a counterbalancing ring which is shrunk onto an offcenter part of the crank shaft in such position that the axis of the ring shall be coincident with the axis of the shaft,—said ring having an integral counterweighting arm which extends from one side of the ring toward the axis thereof, the ring being out of contact with said crank shaft except at isolated points, to wit, the inner end of said counterweighting arm being in engagement with the crank shaft, and said engaging surfaces being interlocked to prevent relative movement of the ring and shaft and there being also an interlocking engagement between a thin part of the ring and a part of the crank shaft.

3. The combination with a crank shaft, of a counterbalancing ring having an integral counterbalancing arm which extends from one side of the ring toward the axis thereof, which ring is applied to an offcenter part of the shaft with its axis coincident with the axis of the shaft and with the center of weight of the counterbalancing arm on the opposite side of the axis of the shaft to that on which lies the center of weight of the offcenter part of the shaft to which said ring is applied,—the end of said arm and a portion only of the thin part of the ring being in engagement with said shaft and the ends of said arm and the part of the shaft with which it engages being formed respectively with interlocking tongues and grooves.

4. The combination with a crank shaft, of a counterbalancing ring having an integral counterbalancing arm which extends from one side of the ring toward the axis thereof,—which ring is applied to an offcenter part of the crank shaft with its axis coincident with the axis of the said shaft and with the center of weight of the counterbalancing arm on the opposite side of the axis of the shaft to that on which lies the center of weight of the offcenter part of the shaft to which said ring is applied, the end of said arm being in engagement with a part of the crank shaft and said engaging surfaces being formed respectively the one with a circumferentially extended non-concentric recess, and the other with a correspondingly shaped projection fitted thereto, and said engaging surfaces being also formed the one with a groove which extends transversely with respect to the first groove mentioned, and the other with a projection fitting said groove, and a small portion of the thin part of said ring being also in engagement with said crank shaft and being securely attached thereto.

5. The combination with a crank shaft having crank arms of different size and shape, and a plurality of counterbalancing rings, each having an opening through it of such size and shape that it may be passed over one end of said crank shaft and past all of the crank arms between said end and its point of attachment to said crank shaft, each counterbalancing ring having an integral counterweighting arm which extends from one side of the ring toward the axis thereof, the end of said counterbalancing arm being in engagement with an offset part of the crank shaft, and the engaging surfaces of said arm and crank shaft being interlocked to prevent any relative movement of the ring and shaft, and a portion only of the thin part of said ring being also in engagement with, and being secured to an adjacent part of the crank shaft.

In testimony whereof I hereunto affix my signature.

CHARLES C. DODGE.